US008164877B2

(12) United States Patent
Frank et al.

(10) Patent No.: US 8,164,877 B2

(45) Date of Patent: Apr. 24, 2012

(54) COAXIAL IN-LINE ASSEMBLY

(75) Inventors: Harwath A Frank, Naperville, IL (US); Tom King, New Lenox, IL (US); Joon Lee, Carmel, IN (US)

(73) Assignee: Andrew LLC, Hickory, NC (US)

( * ) Notice: Subject to any disclaimer, the term of this patent is extended or adjusted under 35 U.S.C. 154(b) by 141 days.

(21) Appl. No.: 12/578,681

(22) Filed: Oct. 14, 2009

(65) Prior Publication Data

US 2010/0027181 A1 Feb. 4, 2010

Related U.S. Application Data

(62) Division of application No. 12/023,904, filed on Jan. 31, 2008, now Pat. No. 7,623,332.

(51) Int. Cl.
*H02H 1/00* (2006.01)

(52) U.S. Cl. ........................................ 361/119; 361/118

(58) Field of Classification Search .................. 361/119, 361/118

See application file for complete search history.

(56) References Cited

U.S. PATENT DOCUMENTS

| | | | | |
|---|---|---|---|---|
| 4,409,637 | A | 10/1983 | Block | |
| 4,554,608 | A | 11/1985 | Block | |
| 5,053,910 | A | 10/1991 | Goldstein | |
| 5,122,921 | A | 6/1992 | Koss | |
| 5,278,720 | A | 1/1994 | Bird | |
| 5,896,265 | A | 4/1999 | Glaser et al. | |
| 6,061,223 | A * | 5/2000 | Jones et al. | 361/119 |
| 6,451,773 | B1 | 9/2002 | Oester et al. | |
| 6,452,773 | B1 | 9/2002 | Aleksa et al. | |
| 6,492,894 | B2 | 12/2002 | Bone et al. | |
| 6,606,232 | B1 | 8/2003 | Vo et al. | |
| 6,636,407 | B1 * | 10/2003 | Ryman | 361/119 |
| 6,721,155 | B2 | 4/2004 | Ryman | |
| 7,035,073 | B2 | 4/2006 | Bennett et al. | |
| 7,094,104 | B1 * | 8/2006 | Burke et al. | 439/620.01 |
| 7,123,463 | B2 * | 10/2006 | Devine et al. | 361/119 |
| 7,170,728 | B2 | 1/2007 | Mueller | |
| 7,349,191 | B2 * | 3/2008 | Harwath | 361/117 |
| 2003/0072121 | A1 | 4/2003 | Bartel et al. | |
| 2003/0179533 | A1 | 9/2003 | Jones et al. | |
| 2005/0259376 | A1 | 11/2005 | Bishop | |
| 2007/0025043 | A1 | 2/2007 | Terada et al. | |

* cited by examiner

*Primary Examiner* — Stephen W Jackson
*Assistant Examiner* — Angela Brooks
(74) *Attorney, Agent, or Firm* — Babcock IP, PLLC

(57) ABSTRACT

A fine arrestor having a body with a bore there through, an inner conductor within the bore, an inner conductor capacitor within the bore coupled between a surge portion of the inner conductor and a protected portion of the inner conductor, and an inner conductor inductor within the bore coupled electrically in parallel with the inner conductor capacitor. A first shorting portion coupled between the surge portion of the inner conductor and the body and a second shorting portion coupled between the protected portion of the inner conductor and the body, for conducting a surge to ground. Also, other coaxial in-line assemblies may be formed incorporating the inner conductor cavity for isolation of enclosed electrical components.

4 Claims, 5 Drawing Sheets

COAXIAL IN-LINE ASSEMBLY

CROSS REFERENCE TO RELATED APPLICATIONS

This application is a divisional application of U.S. Utility patent application Ser. No. 12/023,904, titled "Low Bypass Fine Arrestor" filed Jan. 31, 2008, currently pending, and claims the benefit thereof.

BACKGROUND

1. Field of the Invention

The invention generally relates to in-line surge protection of coaxial cables and interconnected electrical equipment. More particularly, the invention relates to a surge arrestor with a high surge capacity and very low surge pass through characteristic.

2. Description of Related Art

Electrical cables, for example coaxial transmission lines of antenna towers, are equipped with surge arrestor equipment to provide an electrical path to ground for diversion of electrical current surges resulting from, for example, static discharge and or lightning strikes. Conventional surge suppression devices typically divert a very high percentage of surge energy to ground. However, a line and or equipment damaging level of the surge may still pass through the surge device.

"Fine Arrestor" assemblies utilize first and second surge arresting circuits coupled in parallel between the inner conductor and ground to minimize the level of surge pass through. The prior "Fine Arrestor" assemblies are typically formed with a large common off axis body chamber, utilizing discrete inductor, capacitor and gas tube or capsule elements coupled together in a bundle of leads and wire connections. The resulting assembly typically requires multiple axis machining steps requiring remounting of the body pieces, increasing manufacturing time and cost requirements.

Competition within the electrical cable, connector and associated accessory industries has focused attention on cost reductions resulting from increased manufacturing efficiencies, reduced installation requirements and simplification/overall number of discrete parts reduction.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

The inventors have analyzed presently available Fine Arrestor units and discovered they frequently fail to provide a promised minimum level of surge pass through. Because of the common chamber and extended leads of and between the various electrical components the inventors have hypothesized that cross coupling between the circuit elements is occurring as a result of the high levels of electromagnetic fields/energy present when a surge occurs. The present invention minimizes opportunities for cross coupling by isolating the various circuit elements from each other and eliminating and or minimizing the length of any interconnecting leads. The result is a surprising and dramatic reduction in the level of surge bypass in a fine arrestor according to the invention.

Figure 1:
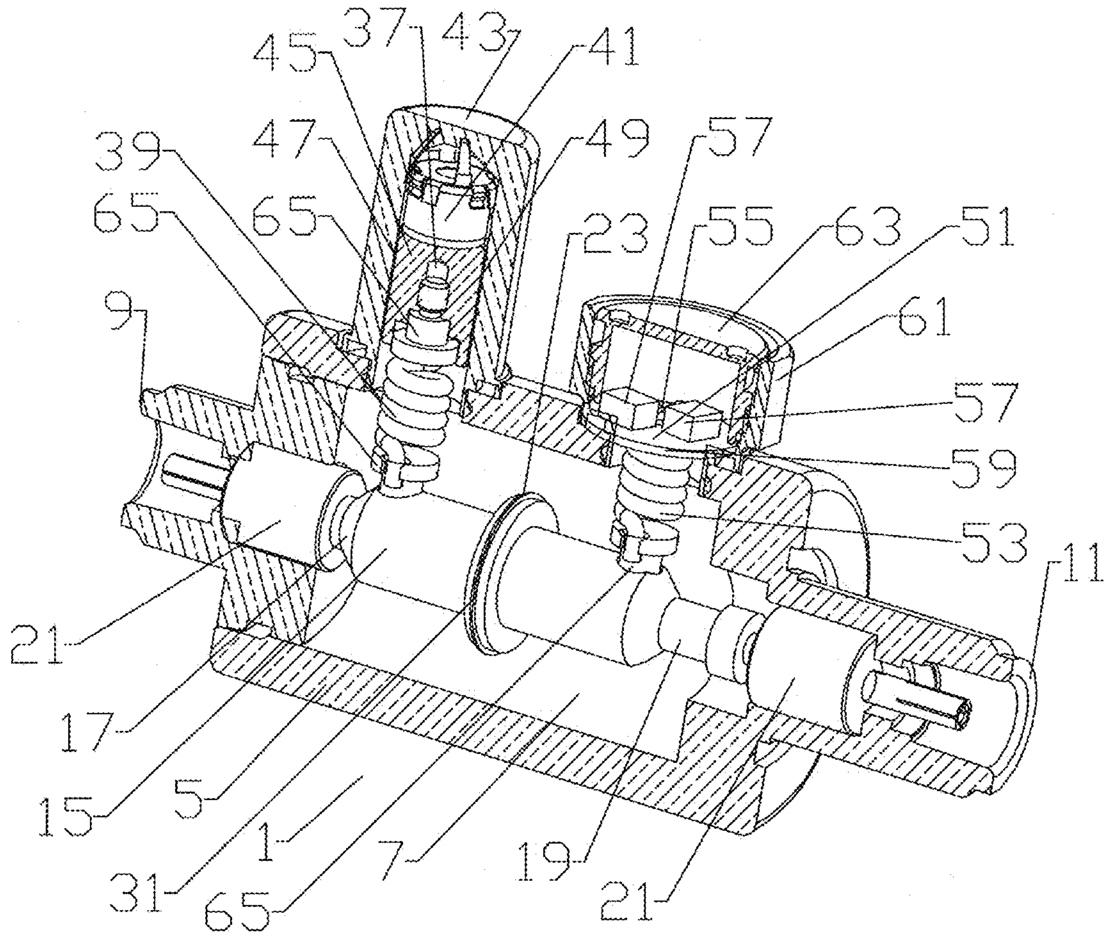
FIG. 1 is a schematic partial cross sectional side isometric view of a first exemplary embodiment of the invention.
Figure 5:
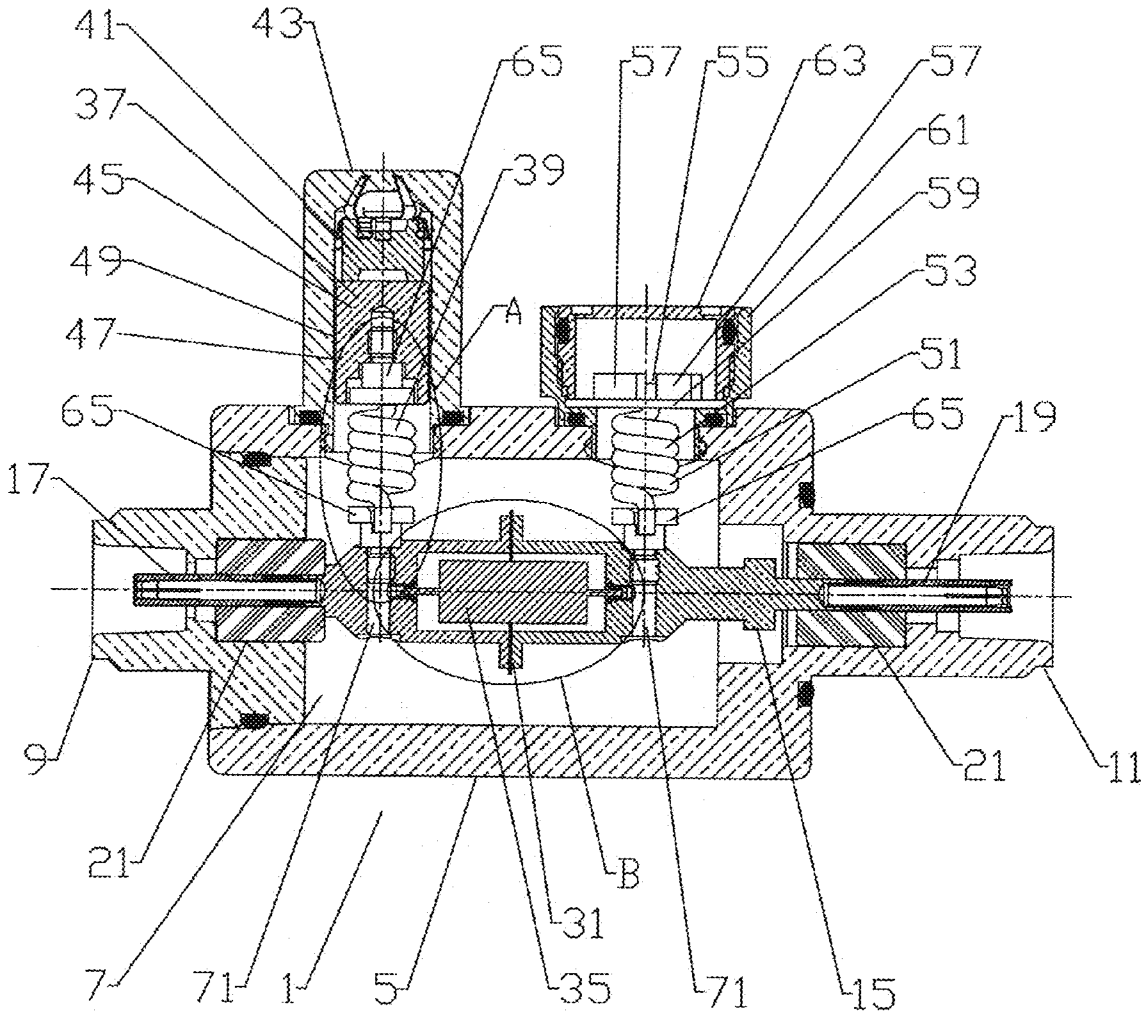
FIG. 5 is a partial cross sectional view of the first exemplary embodiment of the invention.

A first embodiment of a fine arrestor 1 according to the invention is demonstrated in FIGS. 1 and 5. A body 5 has a bore 7 extending between first and second connection interfaces 9, 11. The first and second connection interfaces 9, 11 may be any desired proprietary or standardized connector interface and or direct coaxial cable connection. An inner conductor 15 formed from a surge portion 17 and a protected portion 19 is supported coaxial within the bore 7 by a pair of insulators 21.

Figure 2:
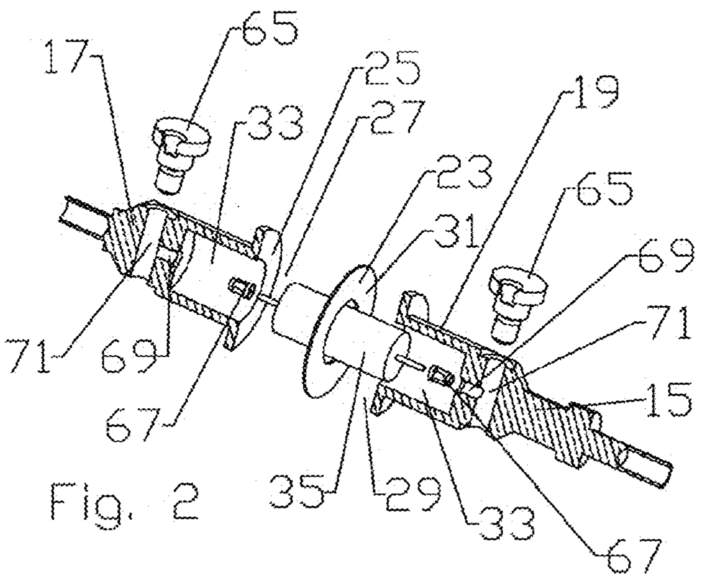
FIG. 2 is an exploded partial cross sectional side isometric view of the inner conductor assembly of FIG. 1.
Figure 3:
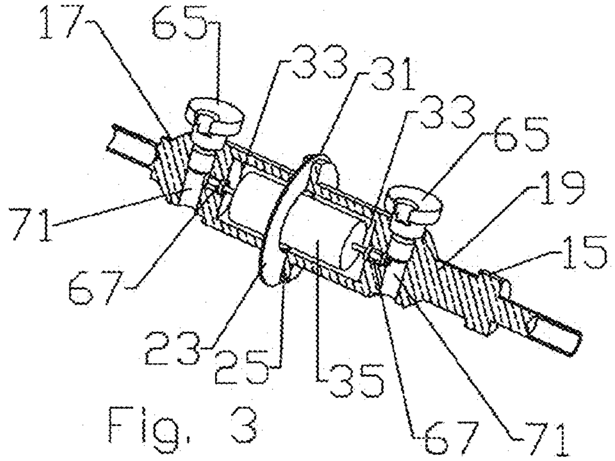
FIG. 3 is a partial cross sectional side isometric view of the inner conductor assembly of FIG. 1.
Figure 4:
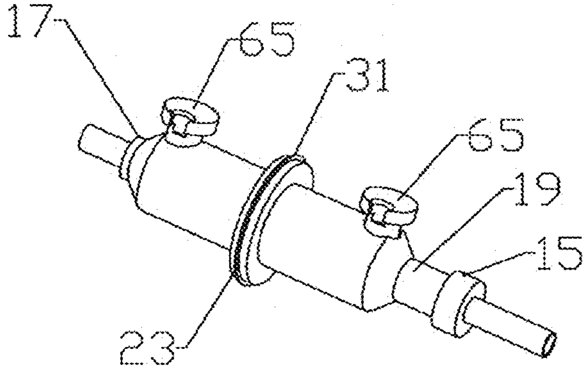
FIG. 4 is an external isometric view of the inner conductor assembly of FIG. 1.

As best shown in FIGS. 2-4, the inner conductor 15 surge portion 17 and protected portion 19 mate together, separated by a dielectric spacer 23 between capacitor surfaces 25 of the surge end 27 and the protected end 29 to form an inner conductor capacitor 31. The capacitance of the resulting inner conductor capacitor 31 is selected to present a low impedance to RF signals in a desired operating band by adjusting the surface area of the capacitor surfaces 25, the thickness and dielectric constant of the dielectric spacer 23. The capacitor surfaces 25 are demonstrated as opposing planar ring faces normal to a longitudinal axis of the inner conductor 15. Alternative configurations include capacitor surface(s) 25 configured to mate with opposing surfaces of a dielectric spacer 23 shaped, for example, as a conical ring, cylindrical tube or the like with smooth or corrugated surfaces according to surface area and or rotational interlock requirements, if any.

Figure 7:
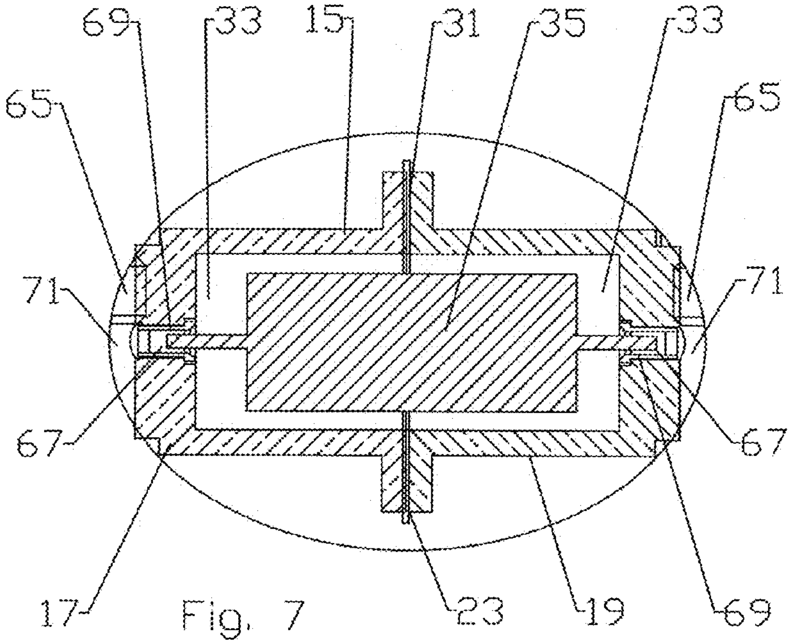
FIG. 7 is a close up view of area B of FIG. 5.

The mating of the surge portion 17 against the protected portion 19 of the inner conductor 15 closes an inner conductor cavity 33 as the capacitor surface(s) 25 mate together against either side of the dielectric spacer 23. Enclosed within the inner conductor cavity 33 is an inner conductor inductor 35 coupled to each of the surge and protected portions 17, 19, placing the inner conductor inductor 35 in parallel with the inner conductor capacitor 31, electrically shielded by the inner conductor cavity 33 sidewalls from the remainder of the assembly, as best shown in FIG. 7.

A first shorting portion 37 is coupled between the surge portion 17 of the inner conductor 15 and the body 5. The first shorting portion 37 has a first inductor 39 in series with a gas discharge tube 41 that terminates against a first endcap 43 coupled to the body 5, providing an electrical path through the first shorting portion 37 to ground. Gas discharge tube(s) 41 or capsules are well known in the surge suppression arts and as such are not described in greater detail, herein. An RF shorting stub 45 positioned between the first inductor 39 and the gas discharge tube 41 is operative to both isolate the gas discharge tube 41 within the first endcap 43 and also as an RF grounding capacitance 47 via a sleeve dielectric 49 positioned between the RF shorting stub 45 periphery and the first endcap 43. The value of the RF grounding capacitance 47 is configured by the thickness and dielectric constant of the sleeve dielectric 49 and the surface area of the RF shorting stub 45 periphery.

A second shorting portion 51 is coupled between the protected portion 19 of the inner conductor 15 and the body 5. A second inductor 53 has a series connection to a parallel arrangement of an RF grounding capacitor 55 and a pair of transient voltage suppression diode(s) 57. Two transient voltage suppression diode(s) 57 are selected to minimize space requirements, compared to application of a single higher power diode package. Alternatively, a single high power transient voltage suppression diode 57 may be applied. The selected transient voltage suppression diode(s) 57 and RF grounding capacitor 55 are preferably mounted upon a printed circuit board 59 positioned outside of the bore 7 enclosed by a second endcap 61. For ease of access and or to provide a secure mounting and electrical connection between traces of the printed circuit board 59 and the body 5, the second endcap 61 may be configured with a cover 63 threadable into the second endcap 61. The parallel arrangement components may be surface mount type, eliminating unnecessary leads. The traces on the printed circuit board 59 may also be arranged for minimum distances between connections and to remove sharp turns that may otherwise operate as cross coupling wave launch points.

Although the first and second shorting portions 37, 51 have been disclosed in detail, one skilled in the art will recognize that in alternative embodiments these portions may be adapted to any desired electrical circuits and or different specific electrical components or elements applied. For example, the first and second inductors 39, 53 may be applied as planar spiral inductors or shorting stubs and or the gas discharge tube 41 and or other circuit elements omitted.

Figure 6:
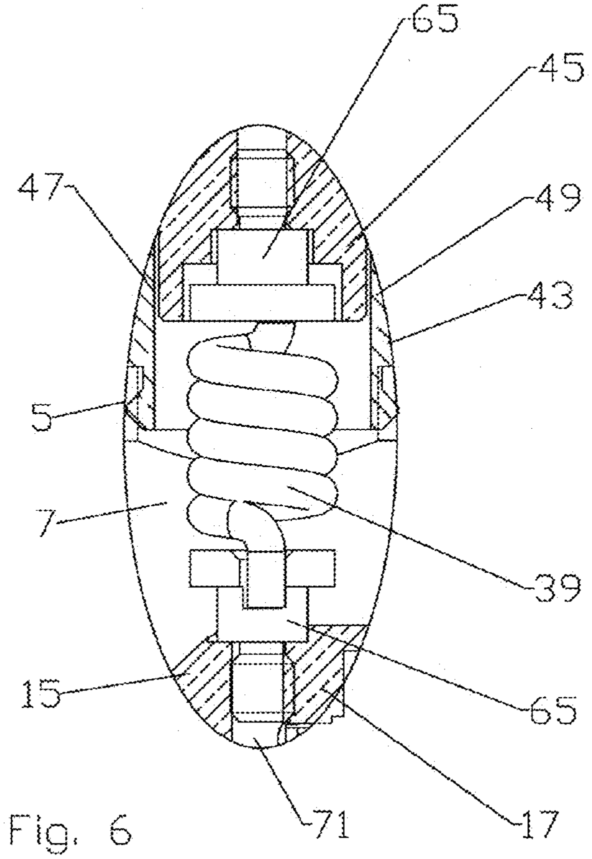
FIG. 6 is a close up view of area A of FIG. 5.

The first and second inductors 39, 53 may be coupled between the inner conductor 15 and the respective RF shorting stub 45 and or printed circuit board 59 connections using screw adapter(s) 65 providing an offset termination for the first and second inductor 39, 53 coils, eliminating the need for additional inductor lead length and bends, as best shown in FIG. 6, while still enabling an easy and secure threaded connection to the inner conductor 15 and or RF shorting stub 45 for ease of assembly and or field exchange of the inductor(s).

The inner conductor inductor 35 leads may be provided with terminating lug(s) 67 that fit into terminating port(s) 69 that extend from the inner conductor cavity 33 into thread bore(s) 71 of the inner conductor 15 for connection of the screw adapter(s) 65. Threading the screw adapter(s) 65 into the respective thread bore(s) 71 provides secure termination and a high quality electrical interconnection between the first and second inductors 39, 53, the inner conductor inductor 35 and the inner conductor 15.

During a surge event, a surge entering the surge side of the fine arrestor 1, along the inner conductor 15, encounters the first shorting portion 37. A surge, typically of a much lower frequency than the operating band of the device, appears at the first inductor 39 and RF grounding capacitance 47, then to the gas discharge tube 41. As the voltage exceeds an ionization threshold, the gas within the gas discharge tube ionizes, conducting the vast majority of the surge energy to the body 5 and there through to ground. A small portion of the surge energy passes the first shorting portion 37 and the RC filter presented by the parallel configuration of the inner conductor capacitor 31 and the inner conductor inductor 35. This reduced surge energy then is presented to the second shorting portion 51 wherein the second inductor 53, RF grounding capacitor 55 and transient voltage suppression diode(s) 57 direct the reduced surge energy to the body and there through to ground. Thereby, minimal surge energy is passed through the protected side of the inner conductor 15 to downstream transmission lines and or electronic devices.

Multiple tests of a prior off axis common cavity fine arrestor surge device, part number 3403.17.0052 manufactured by Huber+Suhner AG of Pfäffikon, Switzerland, with a 4000 Volt, 2000 Amp surge resulted in passage of 93 micro-Joule and 125 micro-Joule through the device. In contrast, a fine arrestor according to the invention presented with the same surge bypassed less energy by an order of magnitude, 4.3 micro-Joule and 10.6 micro-Joule. It is believed that a significant portion of this surprising and dramatic performance improvement is a result of the isolation of the gas discharge tube 41 from the printed circuit board 59 components and the inner conductor inductor 35 and vice versa, which minimizes the opportunity for cross coupling between these components during a surge event.

Figure 9:
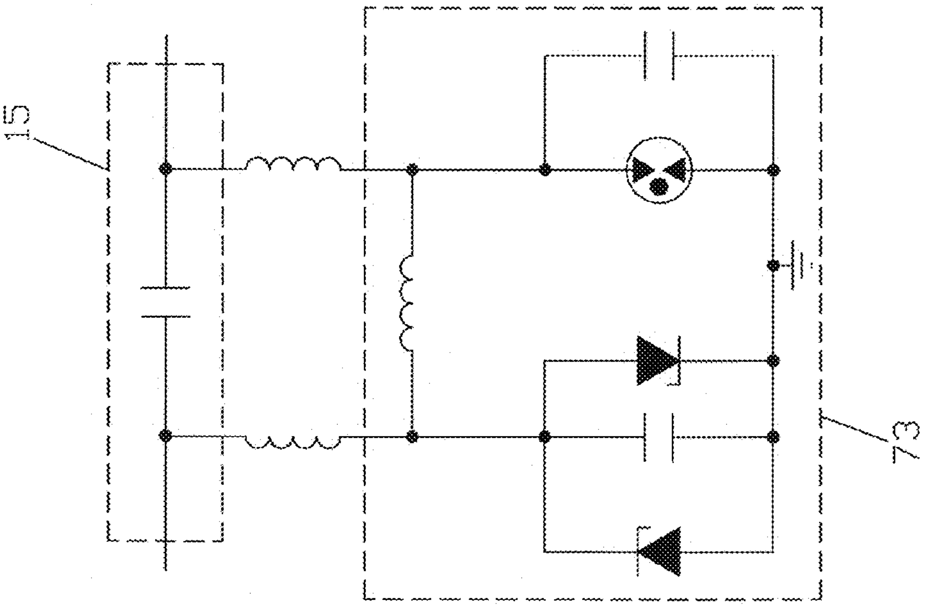
FIG. 9 is a schematic circuit diagram of a hypothetical prior Fine Arrestor demonstrating a common cavity location for various discrete electrical components.
Figure 8:
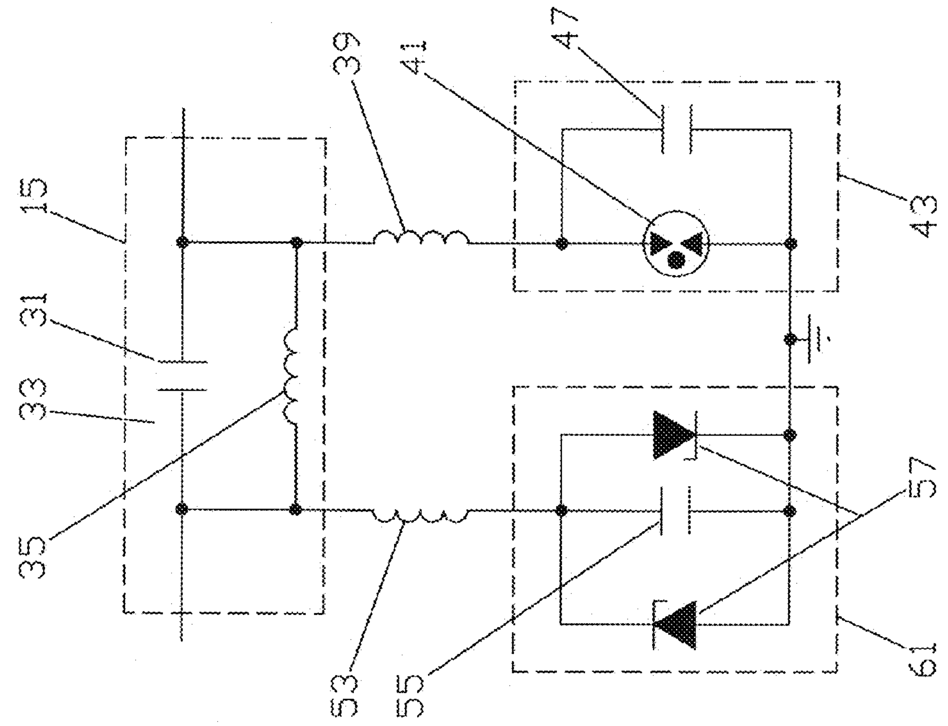
FIG. 8 is a schematic circuit diagram of the first exemplary embodiment, demonstrating the isolation of the various circuit elements from one another.

The improved isolation of the circuit elements from one another according to the first embodiment of the invention is further demonstrated by schematic equivalent circuit FIGS. 8 and 9. In FIG. 8, the inner conductor inductor 35 is enclosed within the inner conductor cavity 33; the gas discharge tube 41 enclosed within the first end cap 43, isolated from the bore by the RF shorting stub 45 and the printed circuit board 59 mounted components of the second shorting portion 51 enclosed within the second endcap 61 and further isolated from the bore 7 by, for example, a ground plane trace covering the majority of the bottom of the printed circuit board 59. In contrast, FIG. 9, demonstrates the hypothetical circuit elements and interconnections of a prior Fine Arrestor, each of the individual components having extended interconnecting leads, the various individual components together occupying a common cavity 73 of the enclosing body.

Preferably, the assembly is permanently sealed, each of the screw adapter 65 threaded connections further secured via thread adhesive to provide maximum resistance to repeated surge strikes. Alternatively, the isolation of the different circuit portions enables a configuration that simplifies field replacement of the elements most likely to be damaged by oversize and or multiple surge events. For example, the first and second shorting portion(s) 37, 51 may be adapted for exchange without removing the assembly from its in-line connection with the surrounding coaxial line(s) and or equipment via removal of the respective first endcap 43, second endcap 61, and or cover 63 to permit unscrewing and removal of desired elements of the first and or second shorting portion (s) 37, 51 from connection with the inner conductor 15.

One skilled in the art will appreciate that the innovative isolation of the inner conductor inductor 35 within the inner conductor cavity 33 in a coaxial in-line assembly is not limited to the present embodiment. Simplified versions of the invention may also be applied such as surge arrestors that omit the second shorting portion circuit elements. In further embodiments this arrangement may be used for a range of different coaxial in-line assemblies. Other electrical components, additional components and or more complex printed circuit board mounted circuits, such as filter circuits, that are inserted and fully enclosed within the inner conductor cavity 33, coupled in series with each end of the enclosing inner conductor 15 may be substituted for and or applied in addition to the inner conductor inductor 35.

| Table of Parts | |
|---|---|
| 1 | fine arrester |
| 5 | body |
| 7 | bore |
| 9 | first connection interface |
| 11 | second connection interface |
| 15 | inner conductor |
| 17 | surge portion |
| 19 | protected portion |
| 21 | insulator |
| 23 | dielectric spacer |
| 25 | capacitor surface |
| 27 | surge end |
| 29 | protected end |
| 31 | inner conductor capacitor |
| 33 | inner conductor cavity |
| 35 | inner conductor inductor |
| 37 | first shorting portion |
| 39 | first inductor |
| 41 | gas discharge tube |
| 43 | first endcap |
| 45 | RF shorting stub |
| 47 | RF grounding capacitance |
| 49 | sleeve dielectric |
| 51 | second shorting portion |
| 53 | second inductor |
| 55 | RF grounding capacitor |
| 57 | transient voltage suppression diode |
| 59 | printed circuit board |
| 61 | second endcap |
| 63 | cover |
| 65 | screw adapter |
| 67 | terminating lug |
| 69 | terminating port |
| 71 | thread bore |
| 73 | common cavity |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A coaxial in-line assembly, comprising:

a body with a bore therethrough;

an inner conductor within the bore extending between a first connection interface and a second connection interface;

an inner conductor capacitor within the bore coupled between a surge portion of the inner conductor and a protected portion of the inner conductor;

an inner conductor cavity, the inner conductor cavity closed between a surge end of the inner conductor and a protected end of the inner conductor; and an electrical component electrically coupled in series with the surge portion of the inner conductor and the protected portion of the inner conductor, enclosed within the inner conductor cavity.

2. The coaxial in-line assembly of claim 1, wherein the electrical component is an inductor.

3. The coaxial in-line assembly of claim 1, wherein the electrical component is a filter circuit.

4. The coaxial in-line assembly of claim 1, wherein the electrical component is an electrical circuit mounted upon a printed circuit board.

* * * * *

UNITED STATES PATENT AND TRADEMARK OFFICE

CERTIFICATE OF CORRECTION

PATENT NO. : 8,164,877 B2
APPLICATION NO. : 12/578681
DATED : April 24, 2012
INVENTOR(S) : Frank Harwath, Tom King and Joon Lee It is certified that error appears in the above-identified patent and that said Letters Patent is hereby corrected as shown below:

Title Page: (12) "Frank et al." should read -- Harwath et al. --

Title Page: (75) Inventors: should read -- Frank Harwath, Naperville, IL (US)
Tom King, New Lenox, IL (US)
Joon Lee, Carmel, IN (US) --

Signed and Sealed this
Seventh Day of August, 2012

David J. Kappos
*Director of the United States Patent and Trademark Office*